United States Patent Office 3,418,494
Patented Dec. 24, 1968

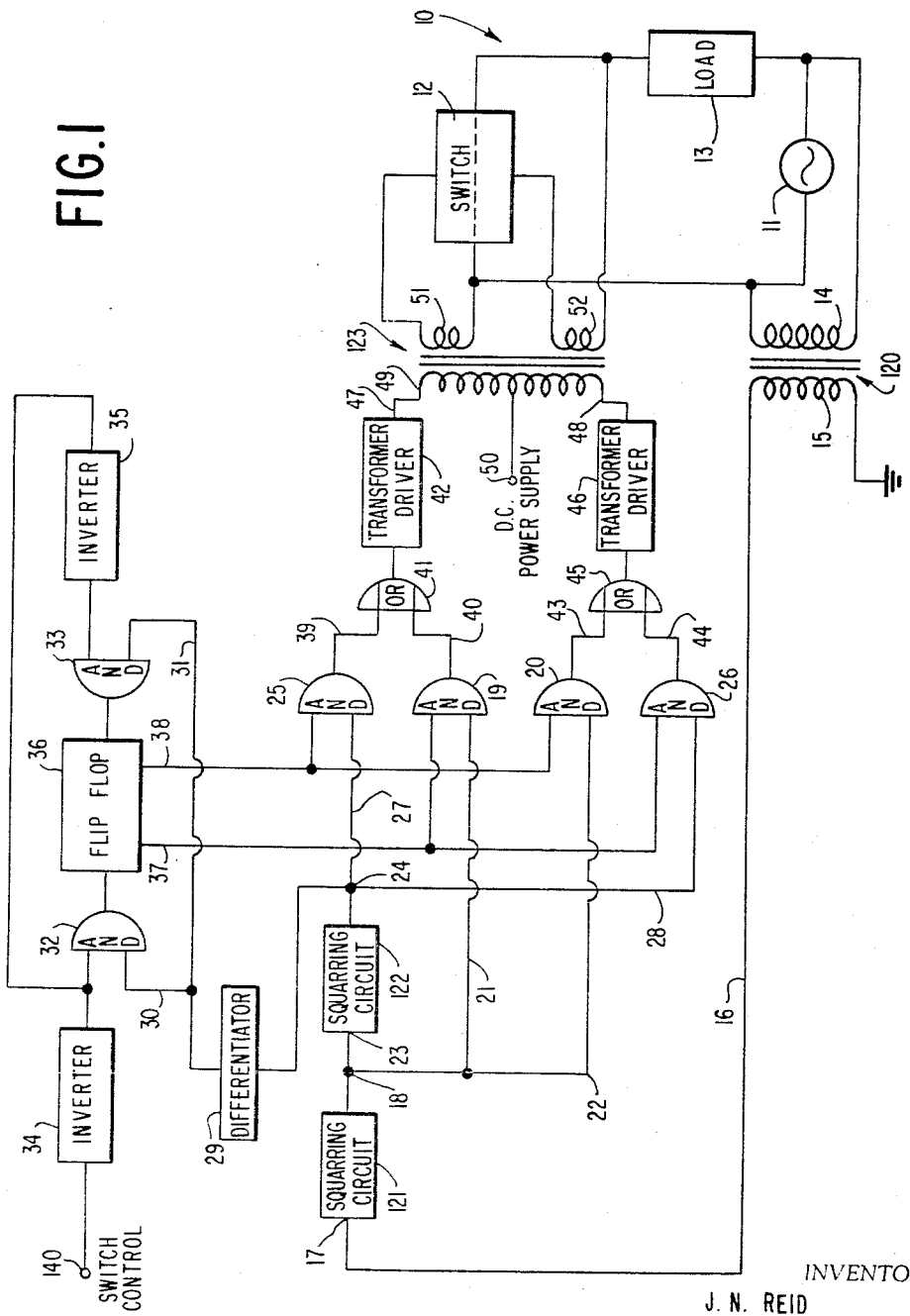

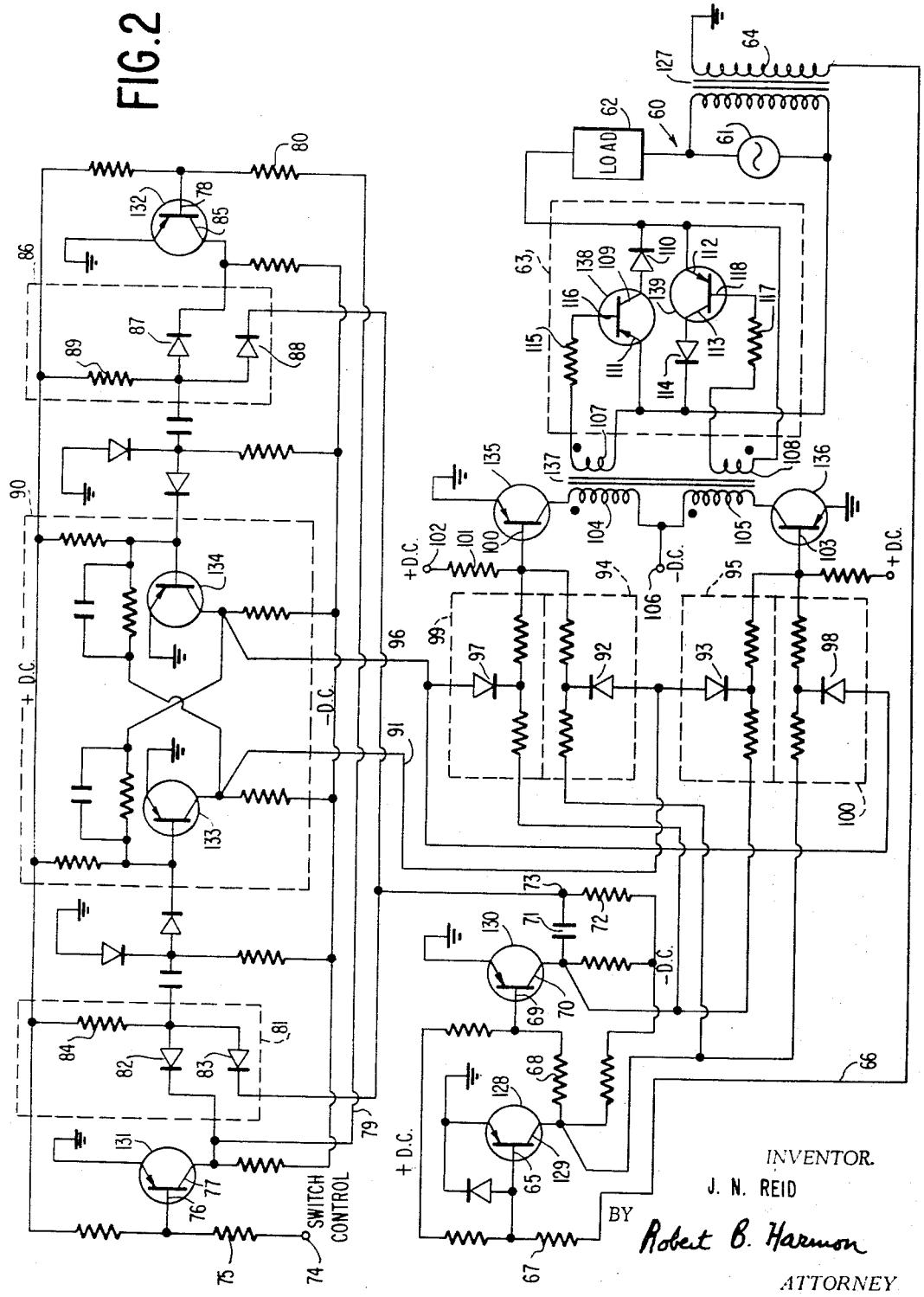

3,418,494
ALTERNATING CURRENT GATE
John N. Reid, Almonte, Ontario, Canada, assignor to Northern Electric Company Limited, Montreal, Quebec, Canada
Filed Aug. 24, 1964, Ser. No. 391,419
11 Claims. (Cl. 307—239)

ABSTRACT OF THE DISCLOSURE

A solid state switching circuit for cyclically switching alternating current voltages to and from a load, wherein the alternating current voltage applied to the load is connected or disconnected in response to a direct current control voltage but where the actual switch function occurs only when the alternating current voltage next crosses the zero voltage axis to minimize power dissipation within the solid state switch.

---

This invention relates to electronic switching circuits in general, and more particularly to an alternating current controlled gate.

An example of an application of the present invention is its adaptability as an interrupter employed to control the supply voltage for a telephone ring signal.

Prior art telephone interrupter circuits have employed mechanical relays wherein the ringing voltage is applied to the line through the relay contact. Such prior art devices are disadvantageous in that the mechanical wear incident to the relay operation necessitates replacement of the relay, and the speed of operation is limited by the inertial forces which must be overcome to actuate the contact.

A primary object of this invention is to provide a solid-state interrupter circuit enabling high speed operation in which the source-switch-load circuit may be arbitrarily grounded at any point or may be allowed to remain floating.

Another object of this invention is to provide a high speed alternating current controlled gating circuit in which a single isolating transformer is employed to isolate the load-circuit switching elements from the circuit ground.

Another object of this invention is to provide a solid-state interrupter circuit employing a phase shifting technique.

A further object of this invention is to provide a switching circuit adaptable for high power operation in which power dissipation in the switching elements is minimized.

These and other objects and features of this invention will be better understood upon consideration of the following detailed description and the accompanying drawing in which:

FIGURE 1 is a block diagram of a typical alternating current controlled switching circuit within the contemplation of this invention;

FIGURE 2 is a schematic circuit diagram of a particular embodiment of the present invention illustrating the functional characteristics of the block diagram of FIGURE 1.

Referring now more particularly to the drawings, there is illustrated in FIGURE 1 a series-connected load circuit represented generally at 10. Load circuit 10 consists of an alternating voltage source 11, a switch device 12, and a load 13. As an example of source voltage employed in a specific application for the present invention, generally, the source employed in a typical telephone ringing circuit produces a sinusoidal voltage waveform oscillating at approximately 20 c.p.s. and rendering an RMS voltage of from 75–100 volts. The switching device 12 of the present invention enables each positive and negative half cycle of the source voltage to be applied to the load 13 or to be blocked from the load.

Preferably, switch device 12 in load circuit 10 comprises two switching elements each of which enable alternating current to flow through the load circuit in one direction while blocking the flow of alternating current in the opposite direction. Consequently, the switching elements may be arranged so that one such element will permit the flow of source current to the load only during the positive half of the alternating cycle from source 11 while the other switching element will permit the flow of source current to the load only during the negative half of the alternating cycle. It is therefore apparent that if the first such switching element, which allows current to flow in the load circuit only during the positive half of the source cycle, is activated only during the negative portion of the source cycle, current will not flow to the load when the source voltage is positive. In like manner, if the other such switching element is activated only during the positive portion of the source cycle, then current will not flow to the load when the source voltage is negative. Thus, if the switching elements in switch device 12 are activated out of phase with the source voltage no current will be applied to load 13; however, if the same switching elements are activated in phase with the source voltage, current will flow through load circuit 10.

Coupled across source 11 is a winding 14 of a voltage transformer 120. Preferably, transformer 120 is a step-down type transformer, and the secondary winding 15 is grounded as shown. The ungrounded end of winding 15 is connected, via conductor wire 16, to a first of two tandemly arranged squaring circuits 121 and 122. The first squaring circuit 121 is directly connected at its input 17 to conductor 16. From terminal 18 on the output side of circuit 121, the square wave output is applied to "and" gates 19 and 20 via conductors 21 and 22 respectively. The input 23 of the second squaring circuit 122 is also connected to terminal 18 and the output terminal 24 of circuit 122 is connected to "and" gates 25 and 26 via conductors 27 and 28 respectively. The output of squaring circuit 122 is also preferably connected to a differentiating circuit 29 whose output is connected, through conductors 30 and 31, to the input of "and" gates 32 and 33 respectively. The output of a first signal inverter 34 is also connected to the input of "and" gate 32 and also connected to the input of a second signal inverter 35. Provision is made to enable the application of a control signal at an input terminal 140 of the first signal inverter 34. The output terminals of "and" gates 32 and 33 are connected to the input terminals of a flip-flop 36. Preferably, flip-flop 36 is a form of any well-known bistable multivibrator having two opposite-state output conditions, such as a positive and negative voltage or a high positive and low positive voltage. A flip-flop output connector 37 associated with the flip-flop input from "and" gate 32 is connected to "and" gate 19 which is also associated with the output of squaring circuit 121. Output connection 37 is also connected to "and" gate 26 which is associated with the output of squaring circuit 122. The other flip-flop output connector 38, associated with the flip-flop input from "and" gate 33, is connected to "and" gate 25 which is also associated with the output of squaring circuit 122. Output connector 38 is also connected to "and" gate 20 which is associated with the output of squaring circuit 121. The output leads 39 and 40 of "and" gates 25 and 19 are joined in "or" gate 41, and the output of "or" gate 41 is applied to the input of a transformer driver 42. In similar fashion the output leads 43 and 44 of "and" gates 20 and 26 are joined in "or" gate 45 and the output of "or" gate 45 is applied to the input of a transformer driver 46. The output connections 47 and 48 of transformer drivers 42 and 46 are respectively connected to the opposite ends of primary winding 49 of isolating transformer 123. Primary winding 49 is center-tapped by a lead wire 50 which is provided to allow connection with a direct current power supply. Two secondary windings 51 and 52 on a transformer 123 are suitably connected to switch device 12 in load circuit 10 to allow alternate switching of the elements in switch device 12 during each half cycle of the alternating voltage from source 11.

The over-all function of the components of the circuit, shown in FIGURE 1 and as described above, is generally to enable the switching elements of switch device 12 to block application of the voltage from source 11 to load 13 when the control signal applied to terminal 140 passes or resides at a predetermined level. Thus, it may be desirable to block or interrupt the load signal when the control signal applied at terminal 140 is at a low value compared to a control signal which will produce the overall function enabling the elements in switch device 12 to energize the load. Under these conditions the individual components of the circuit of FIGURE 1 are generally provided to perform the following functions. When the sinusoidal voltage of source 11 is produced, it is induced in winding 15 of transformer 120 and applied through conductor 16 to the input of squaring circuit 121 in phase with voltage as produced. Circuits 121 and 122 are preferably provided to produce square waves at the same frequency as the source frequency. During each positive and negative half cycle of the voltage from source 11, circuit 121 preferably produces a square wave voltage which is 180 degrees out of phase with the voltage of source 11, and circuit 122 produces a square wave which is in phase with the voltage waveform produced by source 11.

Under conditions requiring a small amount of power to energize load 13, a switch control signal could be applied directly to suitable means, not shown in the drawings, to enable the square wave output of either circuit 121 or 122 to directly activate the switching elements of switch device 12. Thus, through application of a switch control signal and the in-phase and out-of-phase square wave voltages from circuits 121 and 122, the load will be energized when the square wave from circuit 122 activates the appropriate switching elements in switch device 12, and load current will be blocked, when the switch control signal enables the square wave from circuit 121 to activate oppositely the switching elements in switch device 12.

Although the above described direct operation of switch device 12 by the employment of a control signal and the oppositely phased outputs of circuits 121 and 122 is within the contemplation of the invention, it is not generally preferable, in the event that switch 12 requires minimum power dissipation for maximum efficiency operation. In such case it is desirable to initiate the activation of the elements in switch device 12 only during the production of minimum power from alternating source 11. Minimum power dissipation in switch device 12 therefore occurs when the switching function is initiated at the positive and negative crossover points of the alternating cycle of the voltage from source 11. If transistors are employed as the switching elements in switch device 12, minimum dissipation in the transistors will occur in changing from conductive to nonconductive states if the change occurs at the points at which the alternating source voltage passes through zero volts. Thus, by ensuring minimum power dissipation in the switching transistors, the possibility of momentary overheating of a transistor junction with subsequent damage to the transistor is reduced, transistor reliability is enhanced, and maximum power will be delivered to the load.

In order to change the states of switch device 12 at a minimum dissipation point, differentiator 29 may be connected either to terminal 18 at the output of circuit 121, to terminal 24 at the output of circuit 122, or a differentiator may be connected to each of the terminals 18 and 24. When connected to terminal 24, differentiator 29 provides a positive pulse each time the output of circuit 122 changes from negative to positive and provides a negative pulse at the time of the opposite change in state of the same output. Consequently, at the time at which the voltage of source 11 changes from positive to negative, and vice versa, differentiator 29 supplies a pulse to "and" gates 32 and 33. With squaring circuit 122 adapted to produce a square wave voltage which is in phase with the alternating voltage of source 11, differentiator 29, when connected to the output of circuit 122 and to the input of "and" gates 32 and 33, as illustrated in FIGURE 1, may be adapted to trigger flip-flop 36 with the positive pulses created by differentiator 29 at the time of positive going cross-over of the alternating voltage cycle of source 11. Thus, pursuant to the foregoing arrangement, the output connections of flip-flop 36 may be appropriately applied to "and" gates 19, 20, 25 and 26 to enable switch device 12 to change state at the time of positive going cross-over of the alternating cycle of voltage from source 11.

As an alternative, the foregoing described change in state of switch device 12 could also be accomplished at the time of negative going cross-over of the voltage cycle from source 11 by connecting differentiator 29 to terminal 18 at the output of squaring circuit 121. As a further alternative, change in state of switch device 12 could also be accomplished at the time of both the positive going and negative going crossover by connecting a differentiating network to terminal 18 and a differentiating network to terminal 24. The positive output pulses from both differentiating networks may then be subsequently applied to an "or" gate which is connected to "and" gates 32 and 33.

Preferably when the switch control signal applied at terminal 140 is high, or positive, the signal is changed in polarity at the output of inverter 34 and applied to "and" gate 32. The appropriate pulse from differentiator 29, as illustrated in FIGURE 1, which is required to change the state on output connections 37 and 38 of flip-flop 36 is blocked when the resultant low or negative voltage from inverter 34 is applied to "and" gate 32. The output from inverter 34, re-inverted in inverter 35, is applied to "and" gate 33. The re-inverted signal and the appropriate pulse from differentiator 29 combine to open "and" gate 33 and an appropriate pulse from differentiator 29 sets and maintains the voltages on output connections 37 and 38 of flip-flop 36 at or near particular logic levels.

If the resultant flip-flop voltage on connection 38 under blocked conditions of "and" gate 32, and under open conditions of "and" gate 33, is chosen to cooperate with the output of squaring circuits 121 and 122 to open "and" gates 20 and 25, and if, at the same time, the resultant voltage on flip-flop connection 37 under operative and inoperative conditions of "and" gates 33 and 32 respectively is chosen to block the entire output from squaring circuits 121 and 122, thus maintaining "and" gates 19 and 26 inoperative, then the resulting signal from "and" gates 20 and 25 will pass "or" gates 41 and 45 to operate transformer drivers 42 and 46. Through transformer 123, the same resulting signal will drive the switch elements of switch device 12 in phase with the alternating cycle from source 11.

In like manner, under the reversed operative and inoperative conditions of "and" gates 32 and 33 respectively, if the resultant voltage at 37 cooperates with the output of circuits 121 and 122 to open "and" gates 19 and 26, and if the resultant voltage at 38 blocks the entire output from squaring circuits 121 and 122 "or" gates 41 and 45 will pass a signal, and transformer drivers 42 and 46, through transformer 123, will operate the switch elements of switch 12 out of phase with the voltage of source 11. Transformer driver 42 will thus excite the upper half of center-tapped winding 49, and voltage pulses will be induced in secondary windings 51 and 52 during the negative portion of the square wave from circuits 121 or 122. Transformer driver 46 will excite the lower half of winding 49 to induce voltage pulses of opposite polarity in secondary windings 51 and 52 during the negative portion of the square wave from circuits 122 or 121. Thus, when the switch control signal at 140 is low, transformer drivers 42 and 46 are turned on and off by the negative and positive half cycles from circuits 121 and 122 respectively, and switch device 12 operates to block the source voltage from energizing load 13. However, when the switch control signal at 140 changes positively, passing a predetermined voltage, all of the above functions are reversed and the push-pull drive on transformer winding 49 provides an in-phase operation of switch device 12, with drivers 42 and 46 being turned on and off by the negative and positive half cycles from circuits 122 and 121 respectively. Switch device 12 is operated in phase with the source voltage, and therefore load 13 is energized. In the same manner, as the switch control signal changes back negatively passing the same predetermined voltage level, the above functions return to their original operation, and the signal to load 13 is again blocked.

Referring now to FIGURE 2 there is presented a representation of particular solid-state circuitry which serves merely to illustrate a possible functional structure for the components of the general block diagram of FIGURE 1. The present invention is not intended to be limited in any way to the particular circuitry of FIGURE 2. The load circuit, illustrated generally at 60, is composed of a series-connected source 61, load 62, and a switch device 63 which includes transistors 138 and 139. A transformer 127 is coupled across source 61. The voltage induced in secondary winding 64, in phase with the voltage of source 61, is applied through conductor 66 and resistance 67 to the base 65 of a grounded emitter transistor 128. A square wave output, 180 degrees out of phase with the alternating voltage of source 61, is present at collector 129 of transistor 128. From collector 129 of transistor 128, a square wave output is applied through resistance 68 to the base 69 of a second grounded emitter transistor 130. The out-of-phase output from transistor 128 biases transistor 130 to produce a square wave output at collector 70 of transistor 130 which is in phase with the alternating voltage from source 61. The square wave output at collector 70 of transistor 130 is applied to a differentiating circuit which consists of a capacitor 71 and a resistance 72. Each time the output at collector 70 changes polarity, a pulse is produced at the output 73 of the differentiating circuit.

A control signal for switch 63 is applied at terminal 74 through resistance 75 to base 76 of grounded emitter transistor 131. As the switch control signal changes state from a low voltage to a high voltage, and vice versa, passing a predetermined level, transistor 131 produces a quick response. Due to the nature of the transistor biasing and the conduction and non-conduction characteristics of transistor 131, the switch control signal is inverted in polarity at collector 77 of transistor 131. The inverted output is applied to the base 78 of grounded emitter transistor 132, through conductor 79 and resistance 80. Transistor 132 is also provided to produce a quick response as the switch control voltage passes a given level, and it is also provided to re-invert the polarity of the voltage at collector 77 of transistor 131. The inverted output of transistor 131 and the pulse output of the differentiating circuit at 73 are applied to an "and" gate 81. "And" gate 81 comprises appropriately connected diodes 82 and 83 and resistance 84. Similarly, the output at collector 85 of transistor 132 and the pulse output of the differentiating circuit at 73 are applied to an "and" gate 86. "And" gate 86 comprises appropriately connected diodes 87 and 88 and resistance 89. The outputs of "and" gates 81 and 86 are appropriately connected to alternately trigger the opposite states of flip-flop 90 as the switch control signal at terminal 74 changes positively and negatively. Flip-flop 90 is illustrated as a well known bistable multivibrator composed of grounded emitter transistors 133 and 134 and appropriate interconnections. The polarity of the pulse at 73, required to trigger flip-flop 90 is determined by the direction of polarity change at collector 70 of transistor 130. A negative pulse, from a negative going transition at collector 70, is ineffective in triggering flip-flop 90. However, a positive pulse, from a positive going transition at collector 70, may trigger flip-flop 90 depending on the initial set or reset state of the flip-flop. The pulse output at 73 of the differentiating circuit is provided to ensure that the flip-flop changes state only at a crossover point in the alternating voltage cycle of source 61. For the particular circuit of FIGURE 2, the flip-flop changes state only at the positive going crossover point. The output at the collector of transistor 133, the base of which is triggered by the output of "and" gate 81, is connected, via conductor 91, to the anode of diodes 92 and 93 in "and" gates 94 and 95 respectively. The output at the collector of grounded emitter transistor 134, the base of which is triggered by the output of "and" gate 86, is applied, via conductor 96, to the anode of diodes 97 and 98 in "and" gates 99 and 100 respectively. The outputs of "and" gates 94 and 99 are effectively applied to the base 100 of grounded emitter transistor 135. With the aid of an "or" function provided by resistance 101 and a D.C. voltage at 102, the output of either "and" gate 94 or 99 is employed to bias transistor 135 into conduction. Whether "and" gate 94 or 99 triggers transistors 135 depend on the state of flip-flop 90. The out-of-phase square wave output at the collector 129 of transistor 128 is effectively applied to the negative terminal of diode 92 in "and" gate 94, and the in-phase square wave output from the collector 70 of transistor 130 is effectively applied to the negative terminal of diode 97 in "and" gate 99. The state of conduction of flip-flop 90 therefore determines the phase, with respect to source 61, of the voltage required at the base 100 of transistor 135 to bias the transistor into conduction.

In like manner, with the out-of-phase output from the collector 129 of transistor 128 effectively applied to the cathode of diode 98 in "and" gate 100, and the in-phase output from the collector 70 of transistor 130 effectively applied to the cathode of diode 93 in "and" gate 95, the phase of the voltage at the base 103 of transistor 136 required to bias transistor 136 into conduction is also controlled by the conductive state of flip-flop 90. The collector of transistor 135 is connected to one end of one half 104 of a center-tapped primary winding on a transformer 137, and the collector of transistor 136 is connected to the electrically opposite end of the other half 105 of the same center-tapped primary winding on transformer 137. A D.C. voltage is applied to the center tap 106 between the upper half 104 and lower half 105 of the primary winding of transformer 137. As transistors 135 and 136 conduct, the upper and lower halves 104 and 105 of the primary winding are energized alternately during the opposite half-cycles of the voltage from source 61.

On transformer 137 there are provided two secondary windings 107 and 108, each in electromagnetic inductive communication with both the upper and lower halves 104 and 105 of the primary winding of the transformer. Switch device 63 in load circuit 60 is provided with two PNP transistors 138 and 139. The collector connection 109 of transistor 138 is attached to the anode of diode 110, while the cathode of diode 110 is connected to the load side of load circuit 60. The emitter connection 111 of transistor 138 is attached to the source side of load circuit 60. The emitter connection 112 of transistor 139 is attached to the load side of load circuit 60; whereas, the collector connection 113 of transistor 139 is attached to the anode of diode 114, and the cathode of diode 114 is connected to the source side of load circuit 60. One end of secondary winding 107 is connected through resistance 115 to base 116 of transistor 138, and the opposite end of secondary winding 107 is connected to emitter connection 111 of transistor 138. One end of secondary winding 108 is attached to the emitter connection 112 of transistor 139, and the opposite end of secondary winding 108 is connected through resistance 117 to base connection 118 of transistor 139. Secondary windings 107 and 108 are both wound to provide conductive bias on transistors 138 and 139 when the upper half 104 and lower half 105 of the primary winding of transformer 137 are excited by the square wave output which is in phase relationship with the source 61. Diodes 110 and 114 in series with the switching transistors 138 and 139 are provided to prevent current flow in the event that the switching transistors are biased in an inverse manner by the source itself.

Although the transistors of FIGURE 2 are described and represented as grounded emitter PNP transistors, the circuit will function equally well with NPN transistors with the appropriate change in transistor biasing, or with the transistors connected in a manner other than grounded emitter with the appropriate change in biasing and other circuit components.

It is further recognized that numerous changes in the above disclosed details of operation and the arrangement of component parts may be made without departing from the spirit and scope of the present invention. It will be readily apparent to those skilled in the art that the present invention provides novel and useful improvements in alternating current controlled switching arrangements of the character described. The arrangement and types of structural components utilized within the invention may be subjected to numerous modifications well within the purview of this invention, and applicant intends to be limited only to a liberal interpretation of the specification and the appended claims.

Having thus described the invention, what is claimed to be secured by United States Letters Patent is:

1. An alternating current gating arrangement controlled by an externally applied direct current signal, comprising a series arranged load circuit, said load circuit including an alternating current source, gating means controllable by a control means, and output means, phase shifting means driven by said source for providing a current shifted by one-half cycle from said source current, said control means driven by said phase shifting means for normally maintaining said gating means closed but responsive to said direct current signal applied thereto to render said gating means open.

2. An alternating current gating arrangement comprising, a series connected load circuit including an output means, an alternating current source, and a gating means, a first squaring circuit transformer-coupled to said alternating current source, a second squaring circuit connected to the output of said first squaring circuit, one of said squaring circuits providing an output in phase with said source current and the other of said squaring circuits providing an output out of phase with said source current, first control means connected to the output of said first squaring circuit, and second control means connected to the output of said second squaring circuit, the outputs of said first and said second control means transformer-coupled to said gating means, said gating means permitting current flow in said load circuit upon application of a predetermined control signal to said control means connected to said in-phase squaring circuit, and said gating means blocking current flow in said load circuit upon application of a predetermined control signal to said control means connected to said out-of-phase squaring circuit.

3. An alternating current gating arrangement according to claim 2 wherein the gating means comprises a pair of switching elements respectively permitting current flow through said load circuit in opposite directions.

4. An alternating current gating arrangement according to claim 3 wherein the switching elements include semiconductor transistors.

5. An alternating current gating arrangement according to claim 3 wherein the switching elements include semiconductor transistors and diodes.

6. An alternating current gating arrangement according to claim 3 wherein a steering means is connected between the outputs of said squaring circuits and said control means and between said control signal and said control means, whereby the application of said control signal to said control means is directed and the gating means changes state during polarity transition of the alternating cycle of said current source.

7. An alternating current gating arrangement according to claim 6 wherein said steering means includes differentiating circuitry and bistable electronic circuitry, said differentiating circuitry being connected to the output of at least one of said squaring circuits and the output of said differentiating circuitry being applied to trigger the opposite states of said bistable electronic circuitry upon application of a predetermined control signal to the inputs of said bistable electronic circuitry, and the outputs of said bistable electronic circuitry being applied to said first control means and to said second control means.

8. An alternating current gating arrangement according to claim 2 wherein said control signal is a direct current signal.

9. An alternating current gating arrangement comprising, an alternating current voltage source, gating means connected to the said source for applying the alternating voltage thereof to a load circuit, the said gating means responsive to a gating signal of selectable phase relative to the said alternating current voltage, the said gating means being adapted to pass current from the said source to such load circuit in the presence of the gating signal of a first phase and to block the passage of such current in the presence of the gating signal of a second phase and control means connected to the said gating means for applying the gating signal of selectable phase to the said gating means, wherein the said gating signal of selectable phase is provided by tandemly arranged squaring circuits, one of the said squaring circuits providing an output in phase with the said source current and another of the said squaring circuits providing an output out of phase with the said source current.

10. The invention according to claim 9 wherein a predetermined control signal to said squaring circuits enables the output of said in-phase squaring circuit to actuate the gating means allowing current flow to said load circuit, and a predetermined control signal to said squaring circuits enables the output of said out-of-phase squaring circuit to actuate the gating means blocking current flow to said load circuit.

11. An alternating current gating arrangement comprising an alternating current voltage source, gating means connected to said source for applying the alternating voltage thereof to a load circuit, control means connected to said gating means for applying to said gating means a gating signal of selectable phase relative to said alternating current voltage, said gating means aadpted to pass current from said source to said load circuit in the presence of the gating signal of a first phase and to block the passage of said current in the presence of the gating signal of a second phase and said control means including a delay means to inhibit the presence of said gating signal of first phase and said gating signal of second phase until said alternating voltage next crosses the zero voltage axis.

References Cited

UNITED STATES PATENTS

| | | | |
|---|---|---|---|
| 3,119,029 | 1/1964 | Russell | 307—88.5 |
| 3,153,187 | 10/1964 | Klees | 307—88.5 |
| 3,155,837 | 11/1964 | Doyle | 307—88.5 |
| 3,187,260 | 6/1965 | Dove | 308—57 |
| 2,891,171 | 6/1959 | Shockley | 307—313 |
| 3,067,389 | 12/1962 | Yourke | 330—26 |

JOHN S. HEYMAN, *Primary Examiner.*

B. D. DAVIS, *Assistant Examiner.*

U.S. Cl. X.R.

307—218, 243, 247